United States Patent
Kazem-Goudarzi et al.

[11] Patent Number: 5,615,012
[45] Date of Patent: Mar. 25, 1997

[54] METHOD FOR DETECTING OBSTRUCTED NOZZLES

[75] Inventors: Vahid Kazem-Goudarzi, Sunrise; Alex Marron, Plantation; Sterling T. Holmes, Oakland Park, all of Fla.

[73] Assignee: Motorola, Inc., Schaumburg, Ill.

[21] Appl. No.: 610,300

[22] Filed: Mar. 4, 1996

[51] Int. Cl.⁶ .................................................. G01B 11/02
[52] U.S. Cl. .......................... 356/384; 356/372; 356/394; 250/227.14
[58] Field of Search ..................... 356/394, 355, 356/357, 384, 381; 250/227.14, 559.24, 227.15; 348/84, 129, 130

[56] References Cited

U.S. PATENT DOCUMENTS

| | | | |
|---|---|---|---|
| 4,459,743 | 7/1984 | Watanabe et al. | 29/740 |
| 4,770,529 | 9/1988 | Levinson et al. | 356/73.1 |
| 4,882,497 | 11/1989 | Inoue et al. | 356/73.1 |
| 5,079,433 | 1/1992 | Smith | 356/73.1 |

*Primary Examiner*—Georgia Y. Epps
*Assistant Examiner*—Reginald A. Ratliff
*Attorney, Agent, or Firm*—Dale W. Dorinski

[57] ABSTRACT

A method of detecting whether a vacuum nozzle on a high speed component placement machine is obstructed. A vacuum nozzle (10) has a hollow tube with a vacuum port (25) and an opening (12) at one end. The hollow tube having a fiber optic wire (20) located within it such that one end of the fiber optic wire is exposed to be illuminated (50) by a remote light source (30). The fiber optic wire transmits light to illuminate the opening from the interior of the vacuum nozzle. The amount of light exiting the illuminated opening is measured (55) by a remotely located light detector (35). A decision (60) is made as to whether the opening is obstructed by comparing the measured illuminated opening to a predetermined standard.

11 Claims, 2 Drawing Sheets

METHOD FOR DETECTING OBSTRUCTED NOZZLES

TECHNICAL FIELD

This invention relates in general to methods of vacuum pick-up of components.

BACKGROUND

All electronics assembly manufacturing lines require some form of component placement system. The simplest component placement equipment is a steady hand and a pair of tweezers. More complex systems use automatic component placement machines, and, as in manual placement, the object is to pick up a part from a certain position and place it at a new location on a substrate. Pick-up is normally achieved either in manual or automated systems by using a vacuum chuck which is sized to suit the component. Components are presented to the pick-up position using an automatic component feeder. In all cases, two important criteria for component placement are accuracy and reliability. The ability to repetitively place the component in the desired location on the substrate. Repeatability of component placement is typically aided by the use mechanical centering jaws on the placement head. The placement head then typically moves from the pick up position to the desired location on the substrate and deposits the component on the substrate by releasing the vacuum, thus allowing the component to gently fall into the desired location. Components are typically placed, in to an adhesive or a solder paste that prevents the movement of the component during subsequent operations. Both the solder paste and the adhesive have a certain degree of tackiness which tends to hold the component in position.

Two major approaches are typically taken on automated pick and place equipment for surface mount technology. The first is to use a dedicated head for each component. This head transfers components from a feeder to the substrate or printed circuit board (PCB). A conveyer moves the boards past a line of placement heads which progressively populate the board. This type of system is typically used for very high volume, long run situations. The second approach is a single head machine which is microprocessor controlled and contains numerous interchangeable chucks which can rapidly pick parts from a variety of feeders and populate a single board at a time. This approach is more appropriate for short to medium runs with many different assemblies, since set-up time is relatively short and the machines are very flexible.

The level of "user friendliness" should be considered in any decision as to which type of component placement head to use. While some machines require technician level personnel to program and edit machine functions, others require more skilled engineering level assistance. The trade off between flexibility and cost of maintenance must be considered by the user.

In the case of single head component placement machines with multiple chucks, 100 or more vacuum chucks are on a single head. It is extremely important that each of the chucks be maintained in a pristine operating condition. If any of the chucks is misaligned or inoperative, the placement of the components will be in error or the component will be missing from the circuit board. High speed machines that have turret heads are capable of placing very high numbers (5000–8000 per hour) of small components, and the problem of vacuum chuck or vacuum nozzle clogging is a significant one. The small orifice in the vacuum chuck is easily obstructed by environmental debris or particulates. In order to ensure continued up-time and reliability of machines, the vacuum chucks must be scrupulously cleaned on a regular basis. In addition, there is no way of determining whether a vacuum nozzle is obstructed until it becomes completely inoperative, at which time defective product has already been manufactured.

It would be desirable and a significant improvement in the state of the art, if a system could be devised that could detect a clog or obstructed vacuum nozzle in a proactive manner. Such a method would reduce the cost of maintenance of the high speed component placement machines and increase the quality of the assembled electronic product.

DETAILED DESCRIPTION OF THE PREFERRED EMBODIMENT

Clogged vacuum nozzles on high speed component placement systems contribute to the placement defects and cycle time increase of an automated production line. The method of detecting whether of not a vacuum nozzle opening on a high speed component place machine is obstructed encompasses illuminating the vacuum nozzle with a remote light source. The vacuum nozzle contains a fiber optic cable or bundle that is embedded within the vacuum nozzle, in such a manner that the other end of the fiber optic bundle illuminates the interior of the vacuum nozzle and thus the vacuum nozzle opening. As the rotary machine passes by the remote light source the interior of the nozzle is illuminated by the fiber optic. As the turret on the placement continues to rotate the nozzle passes over a measuring device, typically a camera. The measuring device measures the amount of light, if any, emanating from the illuminated vacuum nozzle opening. This measurement is compared to a set of standard criteria, and a determination is then made as to whether or not the opening is clogged. If the opening is not obstructed, it will be seen as a bright light. If the opening is completely obstructed the bore of the nozzle will not be seen and it will be dark. If the nozzle is partially obstructed, a combination of light and dark areas will be seen that represents the amount and degree of obstruction of the nozzle.

Figure 1:
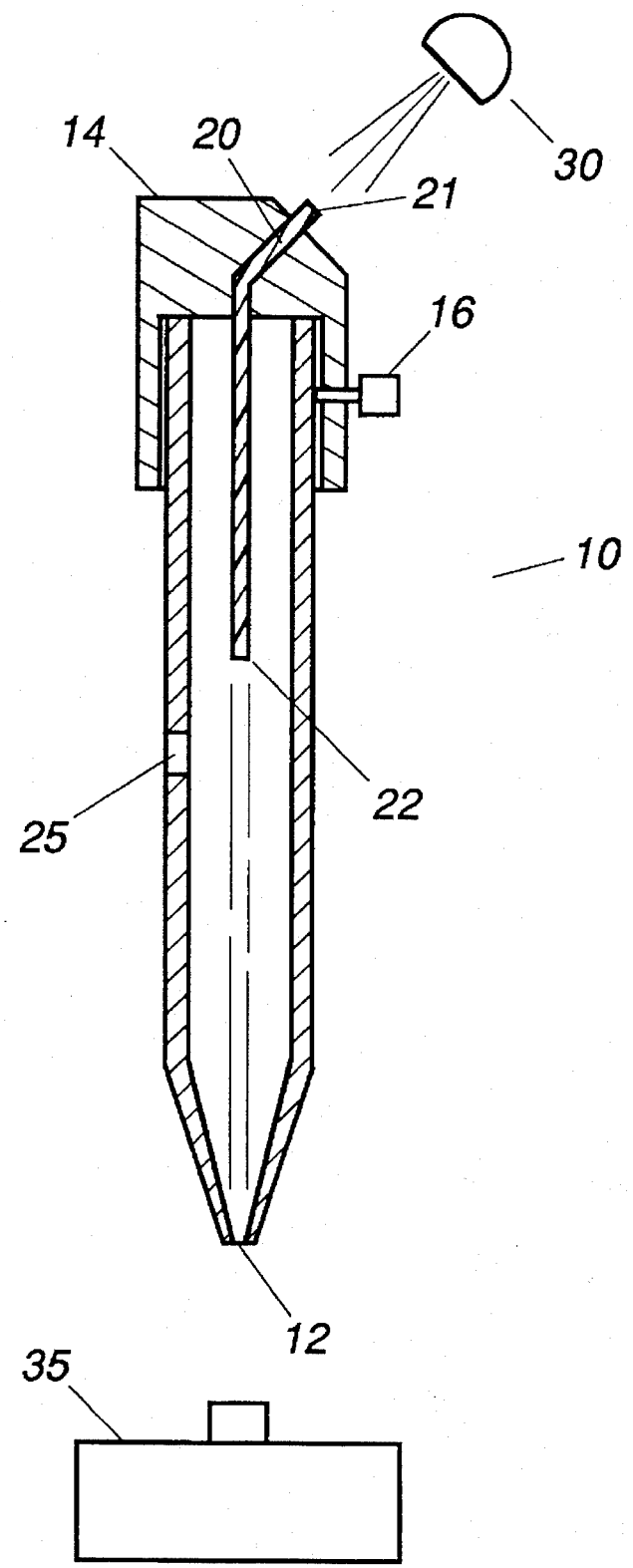
FIG. 1 is a cross setional schematic view of a vacuum nozzle in accordance with the invention.

Referring now to FIG. 1, a pictorial schematic view of a nozzle in accordance with the invention is show. A vacuum nozzle 10 typically consists of a hollow tube having a concentric bore down the center of the tube. One end of the nozzle 10 has an opening 12 that serves as the vacuum chuck to pick up the component (not shown). Although the drawing figure shows the tip of the nozzle as tapered, this is clearly an option and it may be cut off square if desired. The other end of the vacuum nozzle 10 is used to attach the nozzle to the turret head (not shown) of the component placement system. This end of the nozzle is typically called the nozzle block 14. In one particular application, that is component placement machines made by Sanyo of Japan, the nozzle block 14 is attached to the replaceable vacuum nozzle 10 by means of a retaining screw 16. The nozzle block 14 serves to fixture and align the nozzle 10 in proper orientation in the turret head. Passing through the nozzle block 14 is a fiber optic bundle 20. Fiber optics are known by a number of names, such as fiber optic bundles, fiber optic wires, light pipes, or simply a fiber optic and are well known in the modern world. Fiber optics provide an efficient transmission of light through the bundle with minimal attenuation. One end 21 of the fiber optic bundle is arranged so that it is exposed to the exterior of the nozzle. The other end 22 of the fiber optic is arranged so that it lies in embedded or within the interior of the vacuum nozzle tube 10. Exact placement of this end of the fiber optic is not critical, however, it is important that it be arranged within the interior of the vacuum nozzle in such a manner that light emanating from the fiber optic bundle 20 can illuminate the interior of the vacuum nozzle and specifically the opening 12. A vacuum port 25 is also located in the vacuum nozzle and is used to draw the vacuum on the nozzle to pick up the component. A light source 30 is located remotely to the vacuum nozzle. The light source 30 is not physically connected to the vacuum nozzle in any manner. This enables the vacuum nozzle to freely rotate and move on the turret without encumbrance by wires or other power sources. The remote light source may be a dedicated light or simply ambient light provided by lighting fixtures or exterior illumination. An optical measuring device 35 is also mounted remotely to the vacuum nozzle 10 and is used to determine whether or not the opening 12 is obstructed. The optical measuring device 35 may consist of any number of means which can measure light, such as a camera, a light meter, a photo diode, etc. and need not be restricted to the visible range of the electromagnetic spectrum. The use of ultraviolet and/or infrared light is an equally acceptable alternative to the use of visible light. Advantages accrued by remotely locating the optical measuring device 35 away from the nozzle are similar to those accrued by the use of the remote light source 30. Since the optical measuring device is not attached to the nozzle in any way, it does not encumber the nozzle and allows unrestricted freedom of movement.

Figure 2:
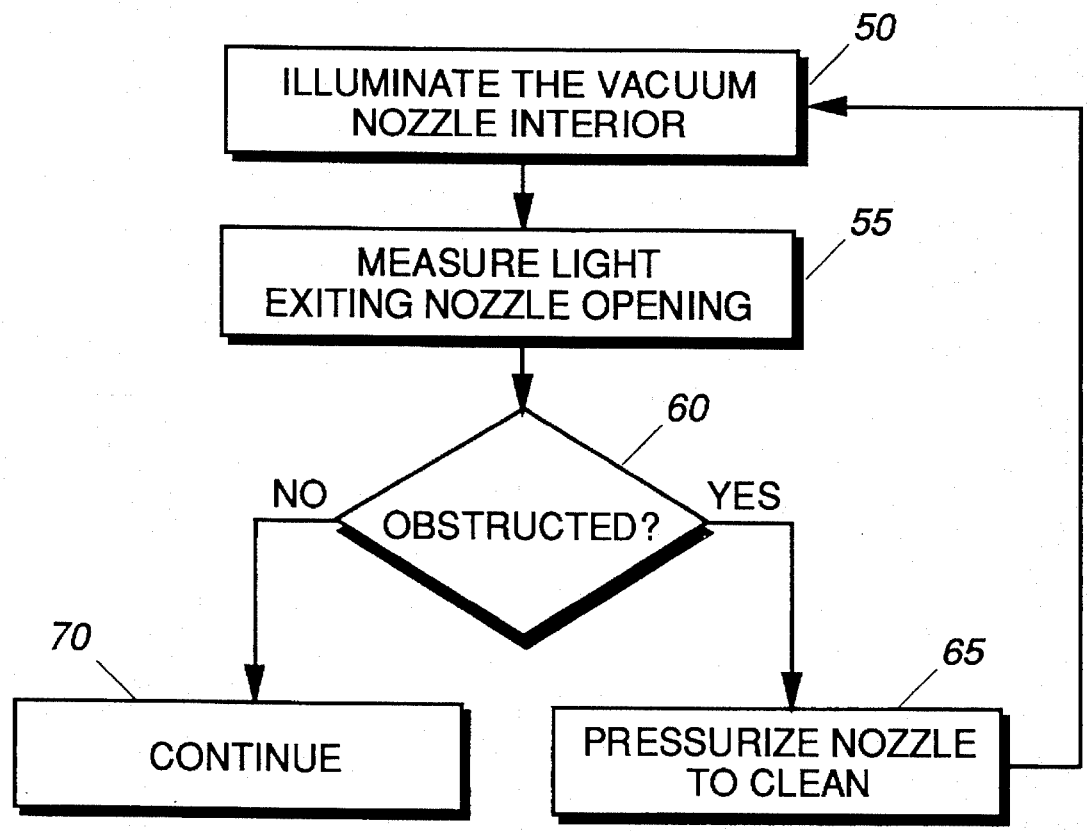
FIG. 2 is a flow chart of a process in accordance with the invention.

Referring now to FIG. 2, in practice the remote light source illuminates the fiber optic bundle (step 50). Light passes down through the bundle and exits at the opposite end of the fiber optic bundle and illuminates the interior of the vacuum nozzle. The amount of light exiting the vacuum nozzle is measured (step 55) by the remotely located optical measuring device. The decision is then made as to whether or not the nozzle is obstructed (step 60). The measurement of light emanating from the nozzle opening is an inverse function of the degree of obstruction of the nozzle opening. That is, obstructed nozzles pass little or no light, and clear or unobstructed nozzles pass a great deal of light. The decision mechanism employed in step 60 is typically a software algorithm resident in the machine operating system. However, in less sophisticated systems it may be manually performed. By comparing to a set of standards, (typically the software algorithm will use a look-up table). A decision is made as to whether or not the nozzle is clogged. If the nozzle is obstructed, an attempt may be made to clear the nozzle by pressurizing it with a pressurized gas such as air or nitrogen at a level above ambient pressure (step 65). At this point the process is repeated, that is the nozzle is again illuminated and light coming out the opening is measured and a decision is made as to whether the nozzle is obstructed. The intent is that the use of pressurized air will dislodge and blow out any debris that may be blocking the nozzle. If the attempt to clear the nozzle was successful, the machine turret continues in its normal way of picking components off of a feeder and placing them on the substrate (step 70). It should be obvious to the reader that the iteration of steps can be performed a number of times. For example, the operator may set the machine parameters to make three attempts to clear the nozzle and if it is not clear on the third attempt, then the nozzle is flagged or labeled by the software as being inoperative. This takes the nozzle out of the system and does not permit it to be used for subsequent assembly operations. If desired the machine operator may be alerted through the red warning light resident on the placement machine. At this point the operator has the option of removing the nozzle and replacing it with a new one or simply bypassing that nozzle and continuing on with production.

Figure 3:
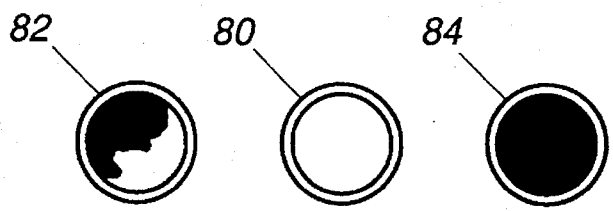
FIG. 3 is a pictorial description of three nozzle conditions.

FIG. 3 shows three typical cases of nozzle conditions. An unobstructed nozzle 80 appears to the camera to be completely white, that is the light shines through the nozzle and no obstruction is seen. A partially obstructed nozzle 82 shows a pattern of black in one or more portions of the nozzle. This pattern may extend from simply a partial obstruction (less than 10%) to nearly total obstruction (approaches 80–90%). A completely clogged nozzle 84 does not have any light exiting the nozzle opening, and thus appears as a black spot on the video camera.

In summary, a non contact method for determining whether or not a vacuum pick up nozzle on a component placement machine has been obstructed has been shown. This method provides significant advantages over the prior art in that the vacuum nozzle and the machine turret are not hindered or encumbered by any additional wires or connections. The remotely located light source and remotely located camera provide complete freedom of the machine turret to operate in the normal fashion. In addition, since most component placement machines typically have a camera for inspection of the part orientation prior to placement on the substrate this same camera can be used to verify the condition of the nozzle. A remote light source is easily mounted in any number of locations on the machine, and thus a cost effective, simple and highly reliable system has been created that provides a significant increase in the reliability and repeatability of high speed component placement machines.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of detecting whether a vacuum nozzle opening on a high speed component placement machine is obstructed, comprising the steps of:

illuminating, by means of a remote light source, one end of a fiber optic wire that is embedded within the vacuum nozzle such that another end of the fiber optic wire illuminates the vacuum nozzle opening from the interior of the vacuum nozzle;

measuring, by means of a remote detector exterior to the vacuum nozzle, intensity of light emanating from the vacuum nozzle opening; and determining whether the vacuum nozzle opening is obstructed by comparing the measured intensity of light emanating from the vacuum nozzle opening to a predetermined standard.

2. The method as described in claim 1, further comprising a step, after the step of determining, of clearing the nozzle opening by pressurizing the vacuum nozzle to a level above ambient pressure.

3. The method as described in claim 1, wherein the step of measuring comprises viewing the illuminated vacuum nozzle opening by means of a remote camera.

4. The method as described in claim 1, wherein the step of measuring further comprises:

capturing an image of the light emanating from the vacuum nozzle opening; and creating a digitized image.

5. The method as described in claim 1, wherein the step of determining comprises an algorithm for measuring the digitized image and comparing it to a set of standards in a lookup table.

6. A method of detecting whether a vacuum nozzle opening on a component placement machine is obstructed, comprising the steps of:

projecting light through the vacuum nozzle opening by:
   illuminating, by means of a remote light source that is not attached to the vacuum nozzle, a fiber optic bundle embedded within the vacuum nozzle, such that the illuminated fiber optic bundle projects a beam of light through the vacuum nozzle opening from inside the vacuum nozzle;

imaging, by means of a camera located remotely from the vacuum nozzle, the projected light emanating from the vacuum nozzle opening so as to create an obstruction image; and comparing the obstruction image to a predetermined standard.

7. The method as described in claim 6, further comprising a step, after the step of comparing, of clearing the nozzle opening by pressurizing the vacuum nozzle to a level above ambient pressure.

8. The method as described in claim 7, wherein the steps of projecting light, imaging, and comparing are repeated after the step of clearing is performed.

9. The method as described in claim 8, further comprising a step, after the second occurrence of the comparing step, of clearing the nozzle opening by pressurizing the vacuum nozzle to a level above ambient pressure.

10. The method as described in claim 8, further comprising a final step, after a second occurrence of the comparing step, of designating the vacuum nozzle as inoperative.

11. A method of detecting whether a vacuum nozzle on a high speed component placement machine is obstructed, comprising the steps of:

providing a vacuum nozzle comprising:
    a hollow tube having a vacuum port connected thereto and an opening at one end, said hollow tube having a fiber optic wire disposed concentrically therein such that a first end of the fiber optic wire is within a hollow portion of the hollow tube and a second end of the fiber optic wire is available to be illuminated by a remote light source;

illuminating the second end of the fiber optic wire with a remote light source in a manner sufficient to illuminate the opening from the interior of the vacuum nozzle;

measuring the illuminated opening by means of a remotely located light detector;

determining whether the opening is obstructed by comparing the measured illuminated opening to a predetermined standard.

* * * * *